(12) United States Patent
Lacy (10) Patent No.: US 9,734,813 B2
(45) Date of Patent: Aug. 15, 2017

(54) BICYCLE BELL WITH SILENCING MECHANISM

(71) Applicant: Christopher Lacy, Encinitas, CA (US)

(72) Inventor: Christopher Lacy, Encinitas, CA (US)

(73) Assignee: Christopher Lacy, Encinitas, CA (US)

( * ) Notice: Subject to any disclaimer, the term of this patent is extended or adjusted under 35 U.S.C. 154(b) by 194 days.

(21) Appl. No.: 14/882,837

(22) Filed: Oct. 14, 2015

(65) Prior Publication Data

US 2016/0111074 A1    Apr. 21, 2016

Related U.S. Application Data (60) Provisional application No. 62/064,797, filed on Oct. 16, 2014.

(51) Int. Cl.
| | | |
|---|---|---|
| *B62J 3/00* | (2006.01) | |
| *G10K 1/10* | (2006.01) | |
| *G10K 1/36* | (2006.01) | |
| *G10K 1/072* | (2006.01) | |

(52) U.S. Cl.
CPC ...... *G10K 1/10* (2013.01); *B62J 3/00* (2013.01); *G10K 1/36* (2013.01); *G10K 1/072* (2013.01)

(58) Field of Classification Search
CPC .... B62J 3/00; G10K 1/00; G10K 1/06; G10K 1/07; G10K 1/071; G10K 1/072; G10K 1/10; G10K 1/32; G10K 1/36; G10K 1/38
USPC ....... 116/148, 149, 150, 155, 166, 167, 169, 116/170, 171, 172; 446/419, 421, 422
See application file for complete search history.

(56) References Cited

U.S. PATENT DOCUMENTS

| | | | | |
|---|---|---|---|---|
| 42,107 A | * | 3/1864 | Parker | G10K 1/07 116/155 |
| 55,392 A | * | 6/1866 | Thompson | G10K 1/07 116/155 |
| 151,356 A | * | 5/1874 | Collins | G10K 3/00 116/172 |
| 513,152 A | * | 1/1894 | Smith | G10K 1/072 116/167 |
| 702,160 A | * | 6/1902 | Seabrook | B62J 3/00 116/166 |
| 1,848,020 A | * | 3/1932 | Merrill | G10K 1/32 116/150 |
| 2,571,178 A | * | 10/1951 | Allen | G10K 1/36 116/148 |
| 2,695,589 A | * | 11/1954 | Hubbell | A63H 5/00 116/150 |

(Continued)

FOREIGN PATENT DOCUMENTS

| | | | | |
|---|---|---|---|---|
| CN | | 114604 A | * 4/1926 | ............ G04B 21/08 |
| CN | | 127891 A | * 9/1928 | ............ G04B 21/08 |

(Continued)

*Primary Examiner* — R. A. Smith
(74) *Attorney, Agent, or Firm* — Adli Law Group P.C.

(57) ABSTRACT

A bell with silencing and or sound dampening mechanism is disclosed. In one embodiment of the present disclosure, the disclosed bell comprises a bell, a clamp body attaching to the bell, a lever installed on the clamp body and is configured to be slidable on the clamp body, a clapper and a cable connecting the lever at one end and the clapper at other end. When the lever is moved in a direction away from the bell, the clapper is retracted into the head of the bell and becomes stationary, preventing the clapper to contact the body of the bell.

11 Claims, 11 Drawing Sheets

(56) References Cited

U.S. PATENT DOCUMENTS

| | | | | |
|---|---|---|---|---|
| 4,186,682 | A | * | 2/1980 | Longsdorf et al. ..... G10K 1/071 116/171 |
| 4,466,329 | A | * | 8/1984 | Hayward ............... G10K 1/072 84/406 |
| 4,484,535 | A | * | 11/1984 | Hayward ................ G10K 1/10 116/149 |
| 7,681,516 | B2 | * | 3/2010 | Chen ....................... G08B 7/00 116/142 FP |
| D774,410 | S | * | 12/2016 | Lacy ........................... D10/118 |

FOREIGN PATENT DOCUMENTS

| | | | | |
|---|---|---|---|---|
| EP | 8841 | A1 | * | 3/1980 ................ B62J 3/00 |
| JP | 3133537 | U | * | 7/2007 ............. G10K 1/071 |
| JP | 2015077957 | A | * | 4/2015 ................ B62J 3/00 |

* cited by examiner

Section A-A

BICYCLE BELL WITH SILENCING MECHANISM

CROSS-REFERENCE TO RELATED PATENT APPLICATIONS

Embodiments of the present invention relate to U.S. Provisional Application Ser. No. 62/064,797, filed Oct. 14, 2014, entitled "A motion activated bicycle bell with an on-off silencing mechanism", the content of which is incorporated by reference herein in its entirety and which is basis for a claim of priority.

FIELD OF THE DISCLOSURE

The present disclosure generally relates to a bicycle bell assembly. More specifically, the present disclosure relates to a bicycle bell assembly with an ON/OFF silencing mechanism.

BACKGROUND OF THE INVENTION

Bells like cowbells have been used for centuries as audible warning or tracking devices for animals, individuals and vehicles. The bells, which normally consist of a bell shaped metal housing with a free swinging internal clapper or striker, are attached to the animal, individual or vehicle in such a way that the natural shaking or movement of the carrier is converted into an recurrent ringing sound. As such, bells are popular amongst bicyclists, particularly mountain bikers who frequently attach bells like cowbells to their bikes or themselves as a means of notifying pedestrians, wildlife or other cyclists to their presence.

One problem with conventional bells is that they have no on/off switch to silence the bell. Once the bell is attached to a carrier at motion, the bell rings more or less continuously, so long as it remains unencumbered, and that the carrier remains in motion. As there are times when the carrier would prefer to mute or dampen the sound of the bell while in motion, such as when in large groups, or when in an area devoid of other people or wildlife, it would be preferable to have simple means by which the carrier can mute and/or dampen the sound of the cowbell.

Though it is possible to silence the cowbell by putting it in one's pocket, bag or purse in such a way that it is encumbered and therefore silenced, this is not always convenient to the bicyclist as it would require unhitching the cowbell from the bicycle or their person and stowing it in such a location. Such an action would require taking one or two hands off of the handlebar, which could cause the cyclist to lose control and suffer injury or damage to property.

Accordingly, there exists a need for an improved bell that can be silenced, dampened or activated by a user quickly and safely while traveling.

SUMMARY OF THE INVENTION

One objective of the present disclosure is to disclose a bell that has a silencing and/or dampening mechanism which mitigates and/or obviates the afore-described disadvantages in conventional bells.

In accordance with one aspect of at least one embodiment of the present disclosure, a bell assembly with a lever controlled ON/OFF switch is disclosed. When the disclosed bell is attached to a bicycle such as on the handlebar of the bicycle, the switch is in such a position that it is easy to reach and further is capable of activating or muting the bell, preferably with a simple one finger motion. Further, the mechanism by which the muting takes place is basically a lever operated cable with a clapper mounted to it terminus, whereby the bell clapper shall either be constrained in a stationary position, or in a free swinging position, depending on the position of the cable and thus the clapper relative to a surrounding bell body.

In yet another embodiment of the present disclosure, the disclosed bell further includes a simple mounting hardware handle so that the user may attach the bell to a person, an animal or a fixed object, such a bicycle handlebar so that it is capable of remaining in a position that is convenient to the hand of the rider, by means of a secondary attachment mechanism, such as a strap, or clamp.

These and other features, aspects and advantages of the present invention will become better understood with reference to the following drawings, description and claims.

DETAILED DESCRIPTION OF THE PREFERRED EMBODIMENT(S) AND INVENTION

The following description is not to be taken in a limiting sense, but is made merely for the purpose of illustrating the general principles of the disclosure, since the scope of the disclosure is best defined by the following claims. Various inventive features are described below that can each be used independently of one another or in combination with other features.

While the illustrations below primarily focus on the bell for bicycle, please note that neither the application/usage of the disclosed bell nor the scope of this invention is limited to usage on bicycles. With little or no modification, the same invention is usable in a variety of scenarios, including but not limited to pets, livestock, hikers, pedestrians, and other wheeled vehicles.

For purposes of the present disclosure, the term "bell" shall includes assembly and/or mechanism, in any form and type, that is a hollow object, typically made of metal and having the shape of a deep inverted cup widening at the lip, that sounds a clear musical note when struck, typically by means of a clapper inside. Examples of bells may include, but are not limited to, cowbells, door bells, church bells, ice cream cart bells, butler bells and emergency bells.

Figure 1:
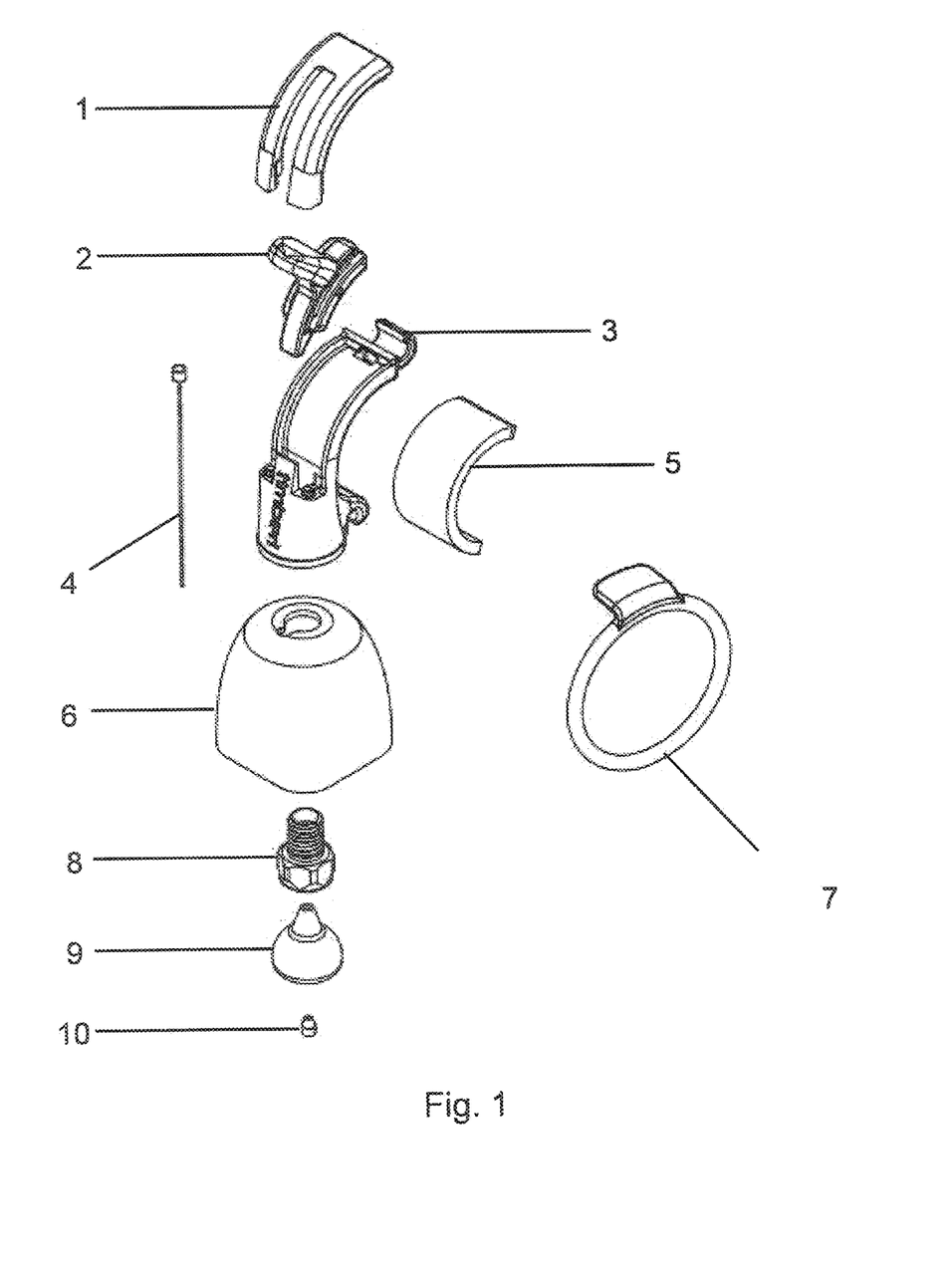
FIG. 1 is a schematic diagram according to an exemplary embodiment of the present invention.
Figure 2:
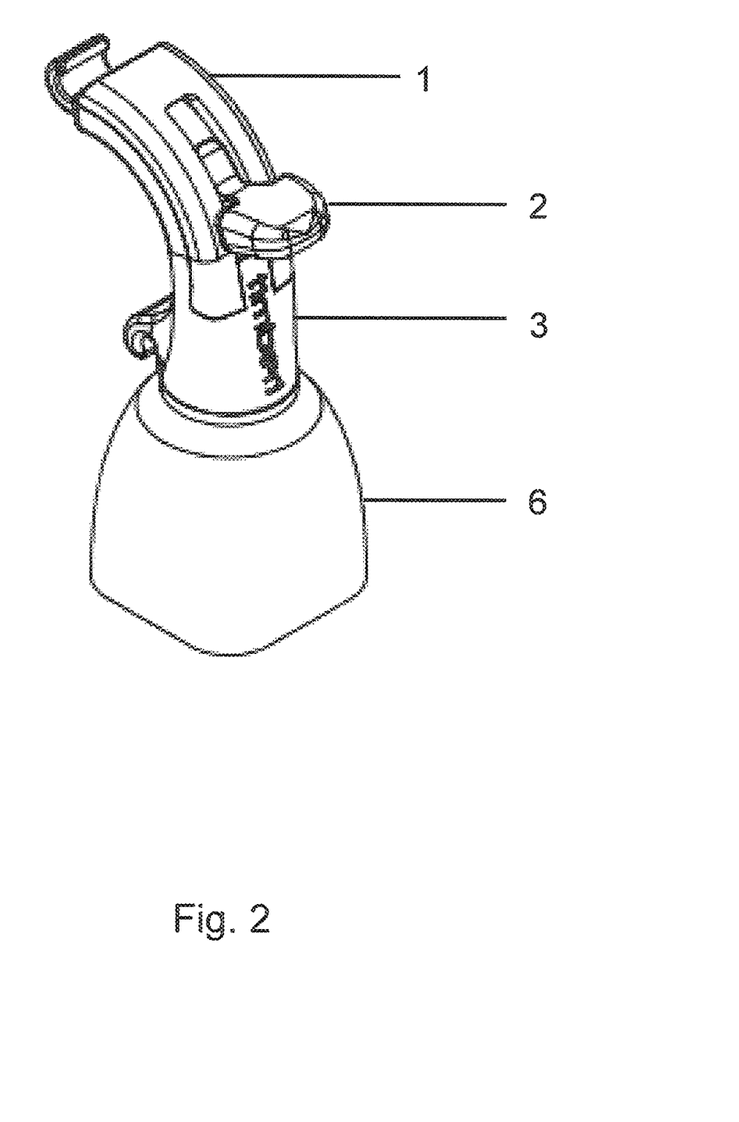
FIG. 2 is a schematic diagram according to an exemplary embodiment of the present invention.
Figure 3:
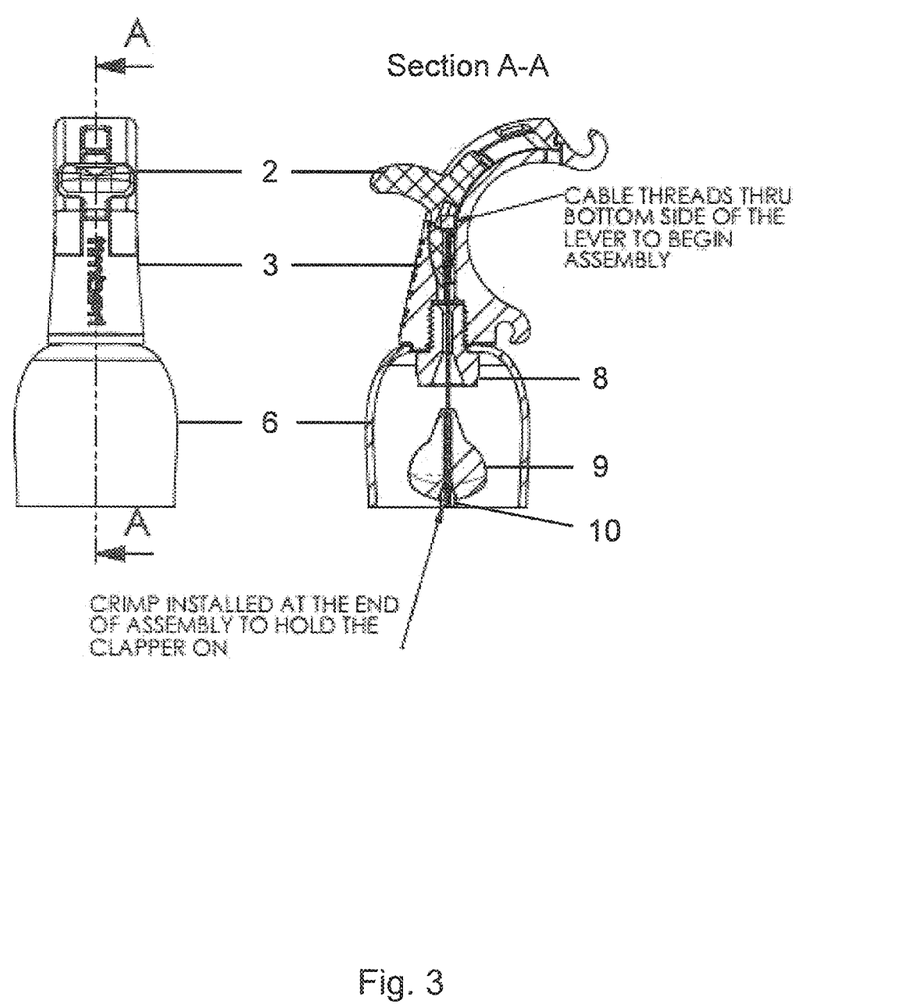
FIG. 3 is a schematic diagram according to an exemplary embodiment of the present invention.
Figure 4:
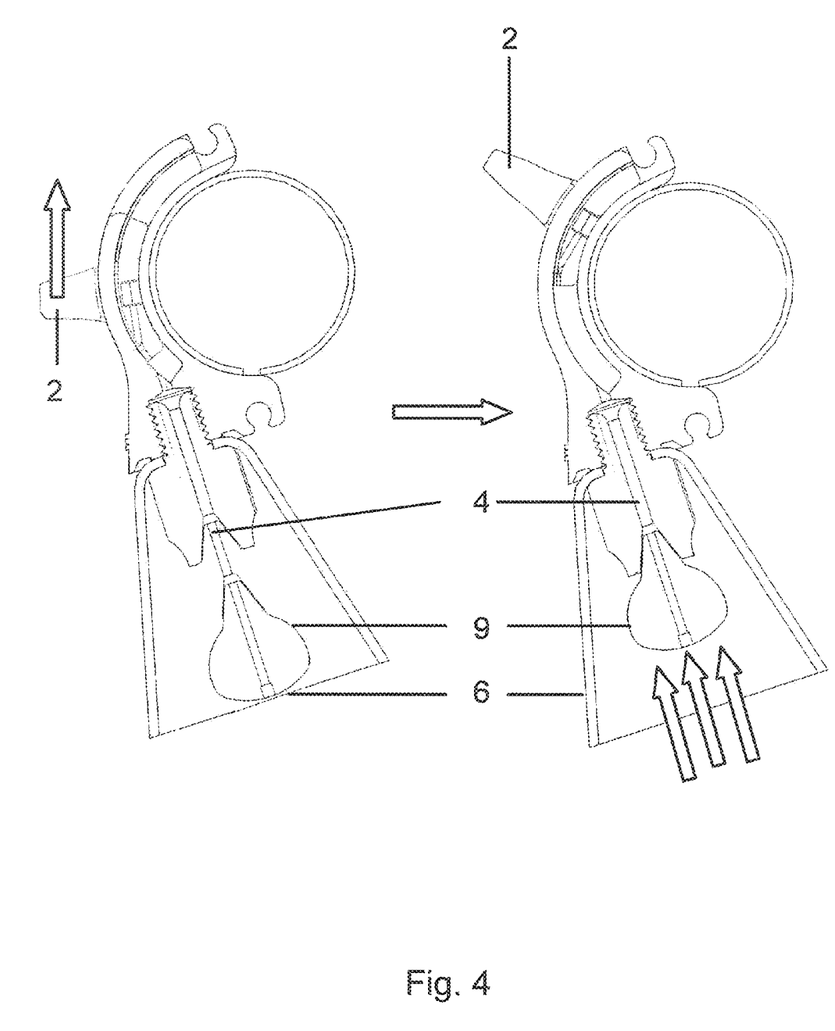
FIG. 4 is a schematic diagram according to an exemplary embodiment of the present invention.

Broadly, embodiments of the present disclosure generally provide a bell with a silencing mechanism. As shown by FIGS. 1 and 2, in one embodiment of the present disclosure, the disclosed bell comprises a bell 6, a clamp body 3 attaching to the bell 6, a lever 2 installed on the clamp body 3 and is configured to be slidable on the clamp body 3, a clapper 9 and a cable 4 connecting the lever 2 at one end and the clapper 9 at other end. As shown by FIGS. 3 and 4, when the lever 2 is moved in a direction away from the bell 6, the clapper 9 is retracted into the head of the bell 6 and becomes stationary, preventing the clapper 9 to contact the body of the bell 6.

Figure 5:
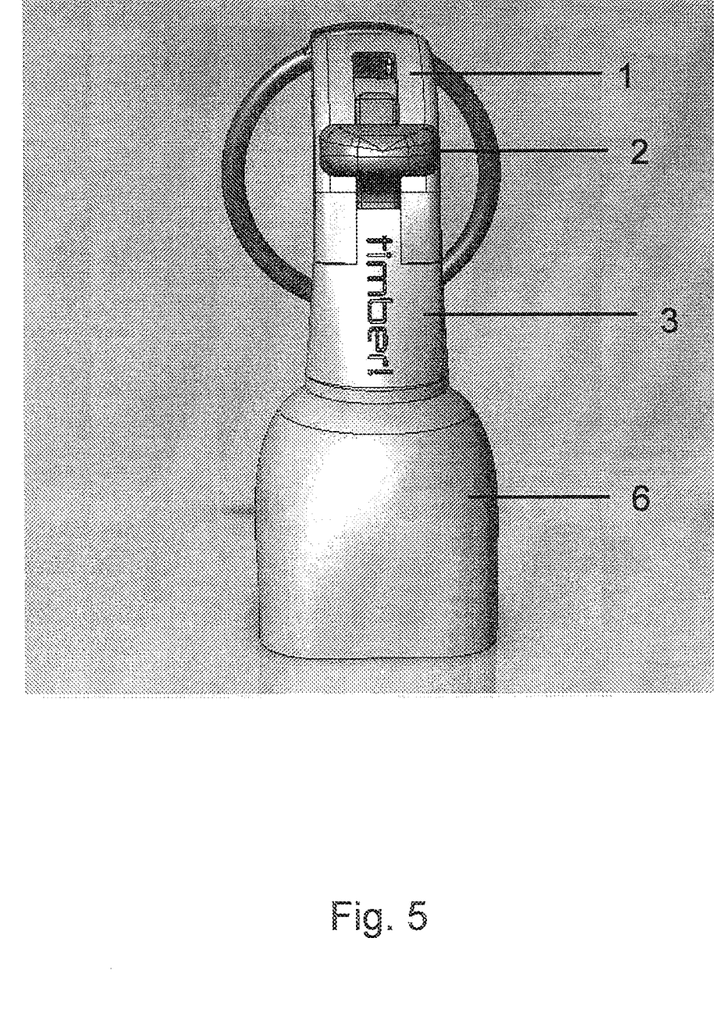
FIG. 5 is a schematic diagram according to an exemplary embodiment of the present invention.
Figure 7:
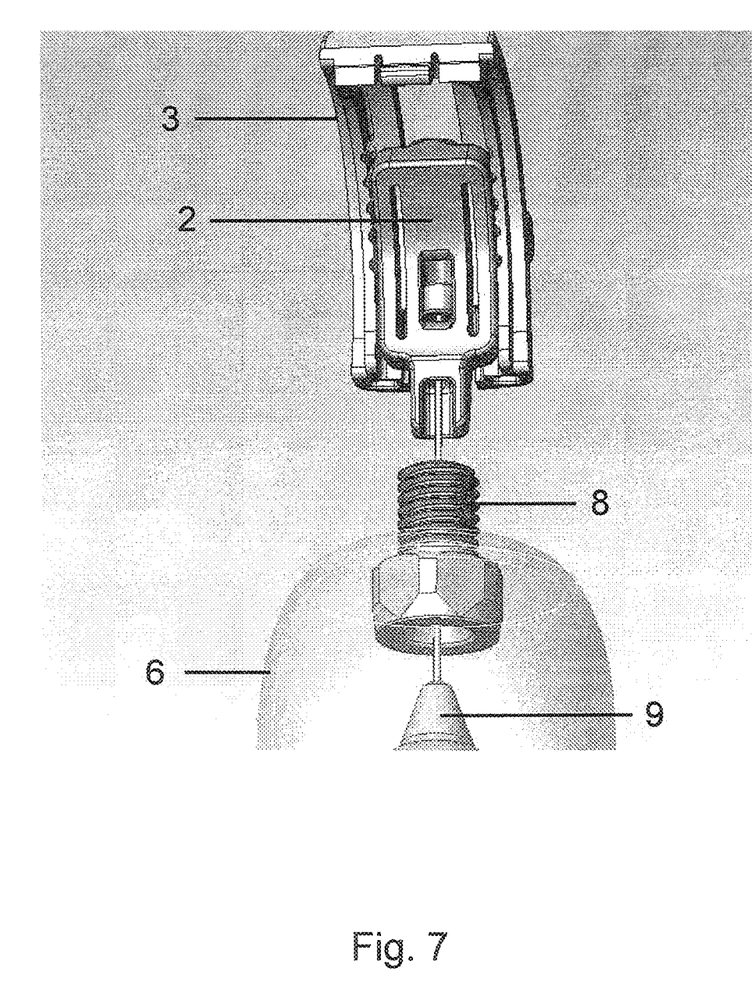
FIG. 7 is a schematic diagram according to an exemplary embodiment of the present invention.
Figure 8:
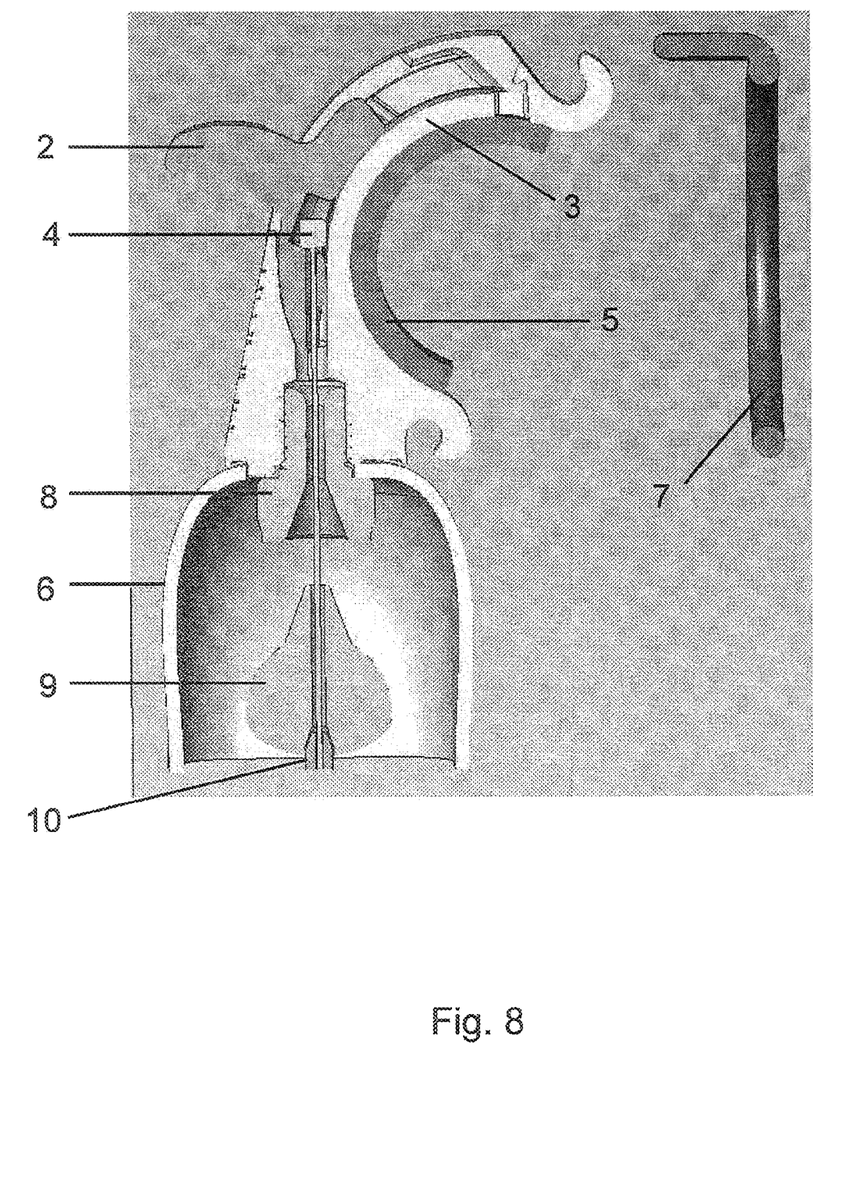
FIG. 8 is a schematic diagram according to an exemplary embodiment of the present invention.
Figure 9:
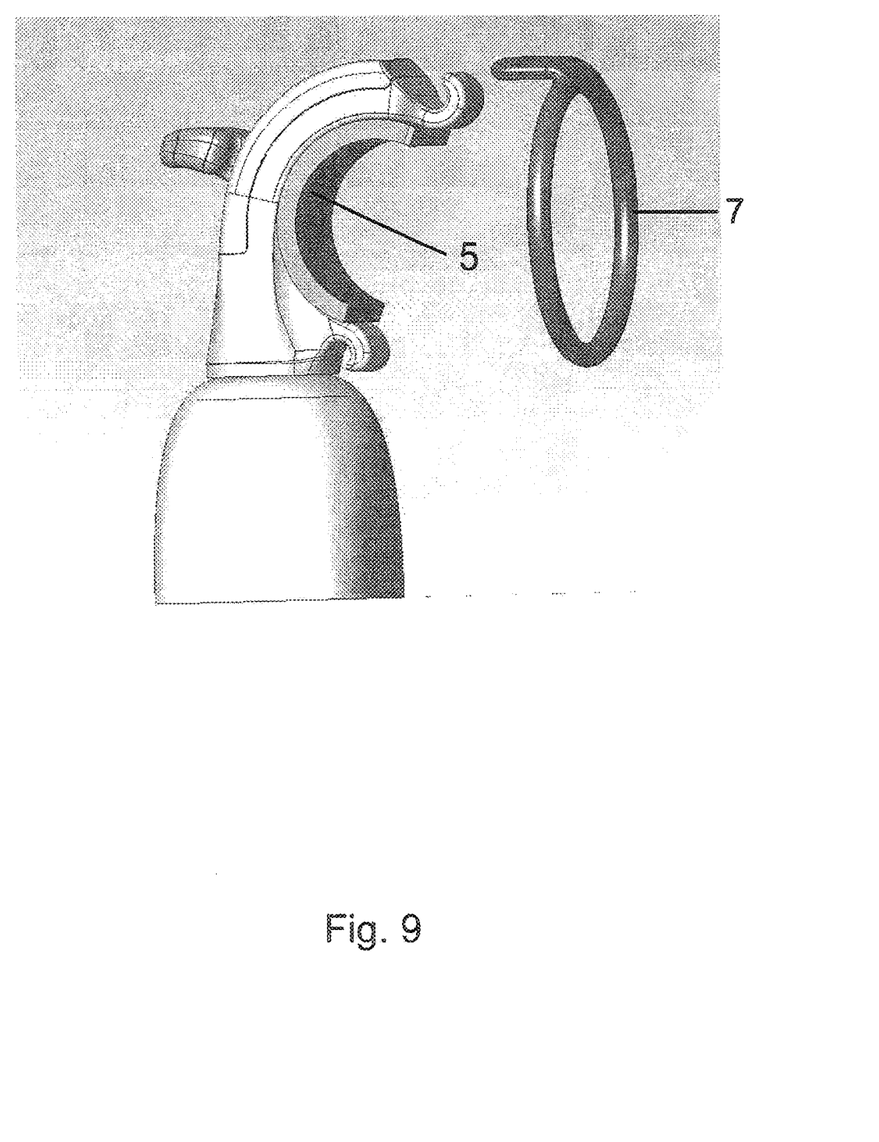
FIG. 9 is a schematic diagram according to an exemplary embodiment of the present invention.
Figure 10:
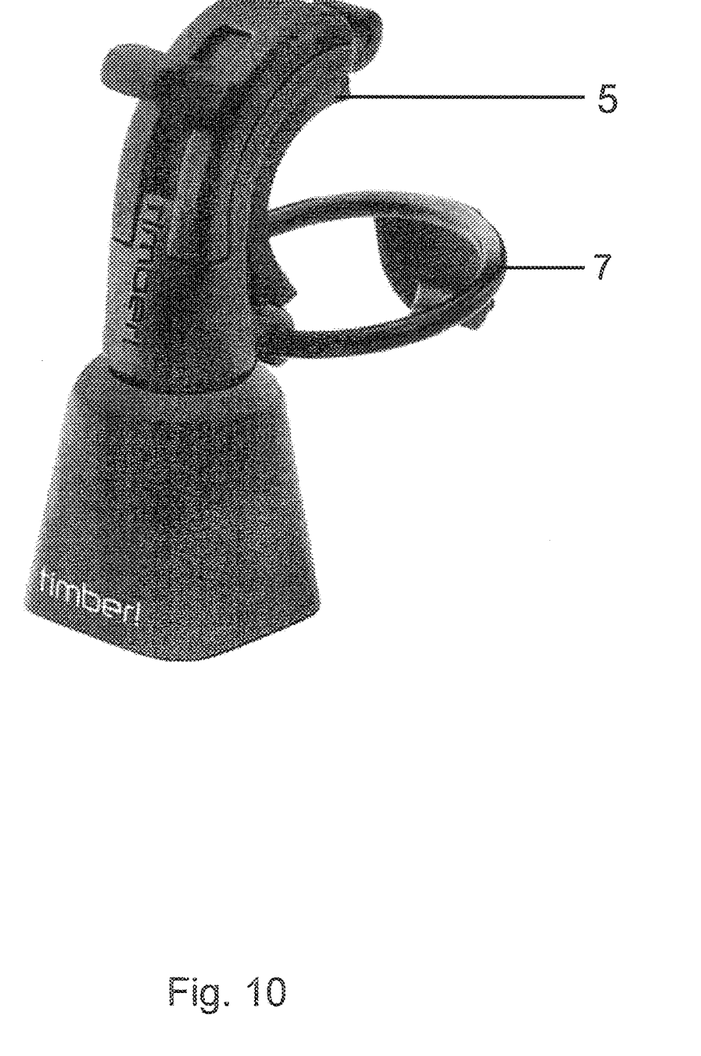
FIG. 10 is a schematic diagram according to an exemplary embodiment of the present invention.
Figure 11:
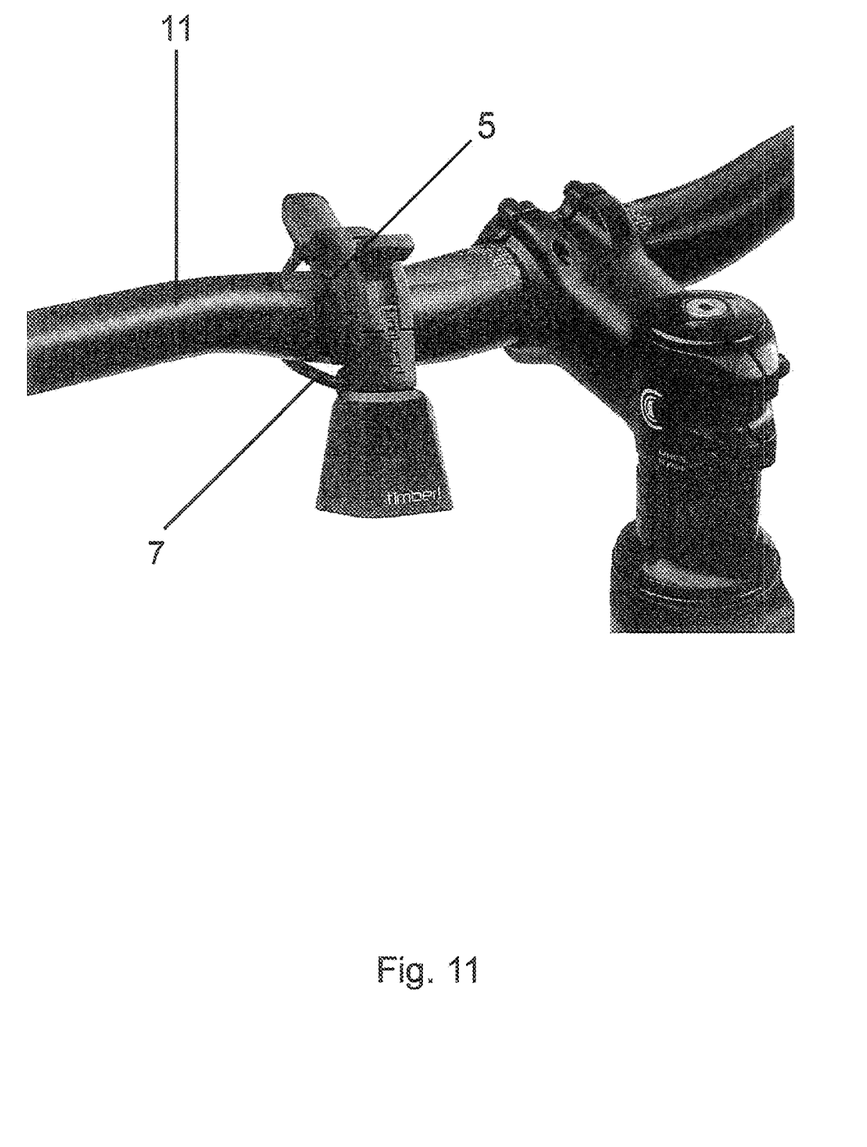
FIG. 11 is a schematic diagram according to an exemplary embodiment of the present invention.

In one embodiment of the present disclosure, as shown by FIGS. 1, 2 and 5, the bell 6 is a hollow metal square or rectangular bell having a closed end and a hollow end. An adaptation to the closed end (head/top) of the bell 6 is made, whereby a hole is drilled permitting the insertion of a hollow screw 8 as shown by FIGS. 7 and 8. The screw 8 secures the bell 6 to the body of an on-off lever mechanism, where the on-off lever mechanism is formed by a lever cover 1, a lever 2, a clamp body 3 and optionally a pad 5 (e.g., bicycle handle bar pad). The clamp body allows the on-off lever mechanism to be connected to a person, animal or transport by means of strap or clamp. For example and not by way of limitation, the clamp body, as shown by FIGS. 9 and 10, further comprises a polyurethane ring 7 and hook(s). The clamp body is secured to a handle bar of a bicycle or bike by clipping/clamping the polyurethane ring 7 on the hook so that the handle bar of the bicycle is secured between the handle bar pad 5 and the polyurethane ring 7 as shown by FIG. 11.

Figure 6:
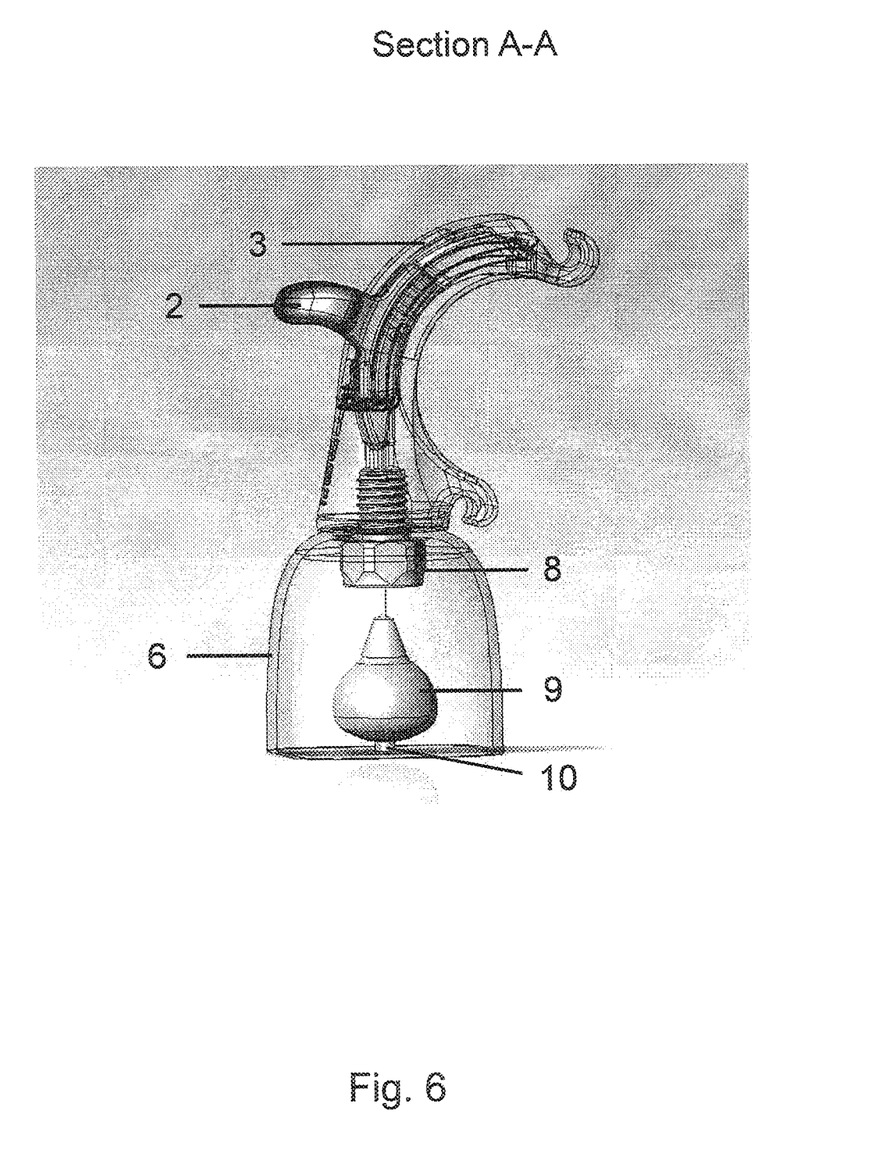
FIG. 6 is a schematic diagram according to an exemplary embodiment of the present invention.

In yet another embodiment of the present disclosure, the clapper 9 is secured to one end of the cable 4 by a crimp 10. The cable 4 is configured in such a way that it is attached to the upper portion of the bell 6 and connected via a shaft (i.e., clamp body 3), and associated hollow screw 8 to the bell 6 in such a way that the cable 4 is able to pass through the unit body and into the top of the bell 4 unhindered. The other (lower) end of the cable is attached a fixed ringer/clapper 9 of sufficient size and weight to act as a pendulum, so that when the cable 4 and clapper 9 are in the lowered position (able to swing freely) as shown by FIG. 6, and the bell 6 body is moved or shaken, the clapper 9 can swing freely within the bell 6 body, and is able to strike the inner sides of the bell 6 body causing sound. When the cable 4 and clapper 9 are retracted via the operator by raising the lever 2, the ringer/clapper 9 is nested firmly within a retraining mechanism (e.g., the screw 8) mounted to the upper portion of the bell 6, and thus unable to vibrate against with the bell body and the bell remains silent as shown by FIG. 4.

In yet another embodiment of the present disclosure, an indexing mechanism is further included within the lever 2 allowing the operator to choose from a range of positions for the clapper 9; from fully OFF, to varying degrees of ON, to fully ON. The operator is able to select the right position, based on the amount of movement of the bike (and thus the bell 6), and the desired level of ringing. In general, fully ON gives the highest level of ringing as the clapper 9 is free to move and contact almost any inner part of the bell 4 (i.e., distance between head of bell 4 and the clapper 9 is the longest). Varying degrees of ON gives lower level of ringing because area which the clapper 9 could contact and move around decreases (i.e., distance between head of bell 4 and the clapper 9 is shorter comparing to fully ON). Fully OFF means there is no contact between the bell 4 and the clapper 9 at all and thus there will be no ringing at all.

In yet another embodiment of the present disclosure, the lever cover 1, the clamp body 3, the screw 8 are made of Nylon, preferably Nylon 6 GF. The lever 2 is made of POM Acetal Copolymer or Nylon as well. Cable 4, bell 6, clapper 9 and crimp 10 should be metallic, preferably made by stainless steel (ferritic) and/or plain carbon steel. The handle bar pad 5 and the ring 7 can be made by polyurethane or any material with similar characteristics.

While the invention herein disclosed has been described by means of specific embodiments, numerous modifications and variations could be made thereto by those skilled in the art without departing from the scope and spirit of the invention set forth in the claims.

In particular, the inventor notes that several potential variations exist in the way the plunger mechanism operates. In addition to the aforementioned lever mechanism, the possibility for a pen-type push click assembly has already been claimed by this inventor.

Additionally the direction of turn of the lever relative to the bell may vary based on engineering needs, ergonomics and aesthetics. Secondarily, the mounting hardware shown in the drawings is shown as a simple strap or clamp. In practice, it is more likely that the mounting hardware would contain specific embodiments (such as holes for screws, etc.) for accepting standard handlebar mounting hardware. Further, it is noted that many different shaped bells may be used with little or no modification required.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

What is claimed is:

1. A bell comprising:
    a bell;
    a clapper;
    a lever connecting to the clapper with a cable and is configured in a way that when the lever is lifted, the clapper is retracted into the bell and becomes stationary; and
    an attaching mechanism attaching the bell to a person, an animal or a transport.

2. The bell of claim 1, wherein the bell is metallic.

3. The bell of claim 1, wherein the bell is cowbell.

4. The bell of claim 1, wherein the bell is square or rectangular.

5. The bell of claim 1, wherein the attaching mechanism comprises a polyurethane ring, a hook and a handle bar pad.

6. The bell of claim 5, wherein the attaching mechanism is secured to a handle bar of a bicycle or bike by clipping the polyurethane ring on the hook so that the handle bar of the bicycle is secured between the handle bar pad and the polyurethane ring.

7. The bell of claim 1, wherein the lever is configured to be operated with one human finger.

8. The hell of claim 1, wherein the attaching mechanism is a clamp and the lever is located on the clamp and configured to be slidable on the clamp.

9. A bell comprising:
    a hollow metallic bell;

a clamp attaching to the hollow metallic bell;
a lever installed on the clamp and is configured to be slidable on the clamp;
a clapper;
a cable connecting the lever at one end and the clapper at other end; and
wherein when the lever is moved in a direction away from the hollow metallic bell, the clapper is retracted into the hollow metallic bell's head and becomes stationary, preventing the clapper to contact the hollow metallic bell.

10. The bell of claim 9, wherein the lever further comprise an indexing mechanism and is configured in a way to allow a user to choose from a range of positions for the clapper; from fully off, to varying degrees of on, to fully on.

11. The bell of claim 9, wherein the clamp further comprises a lever cover and a pad.

* * * * *